Jan. 5, 1932.  H. ANSCHÜTZ-KAEMPFE  1,840,104
GYROSCOPIC APPARATUS FOR STABILIZING BODIES
Filed April 6, 1929  2 Sheets-Sheet 2
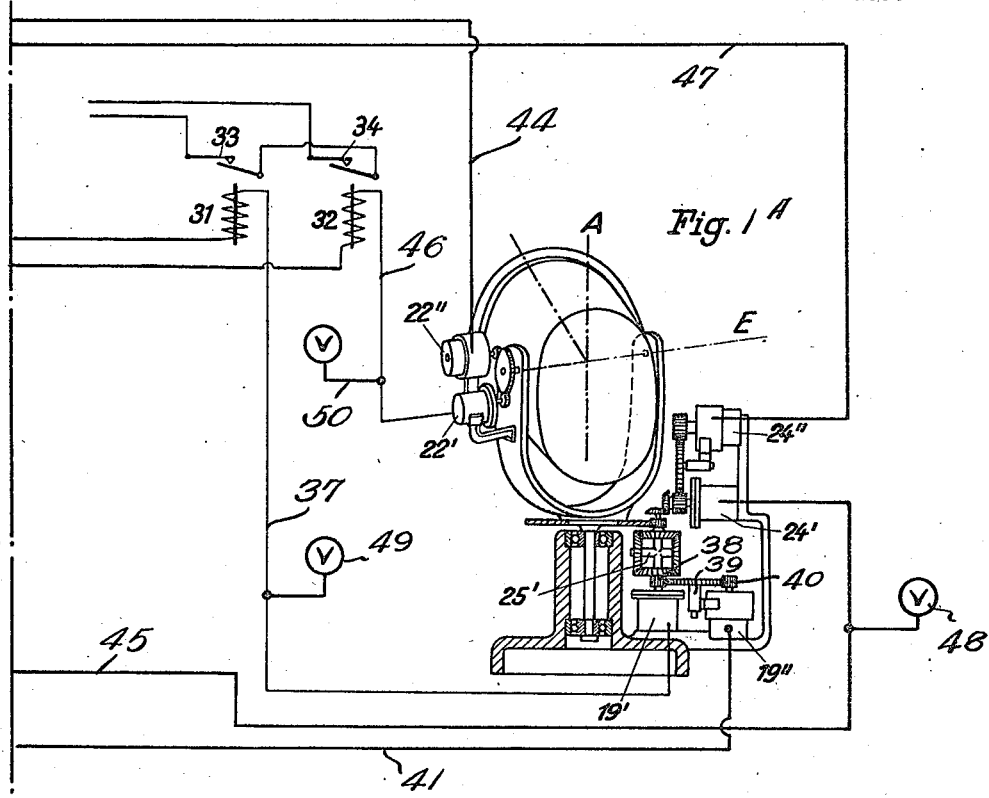
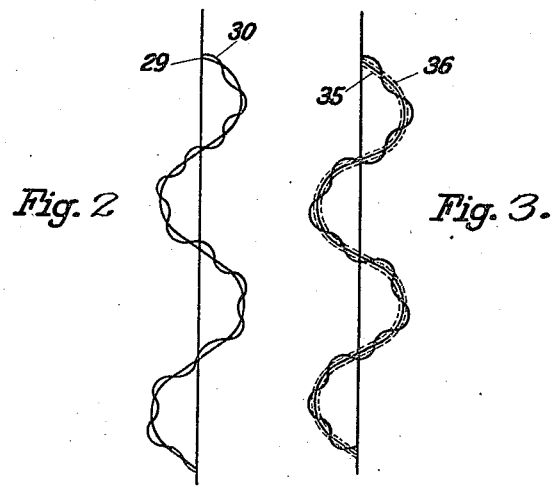
Inventor:
Hermann Anschütz-Kaempfe
By Pennie, Davis, Marvin & Edmonds
Attorneys Patented Jan. 5, 1932

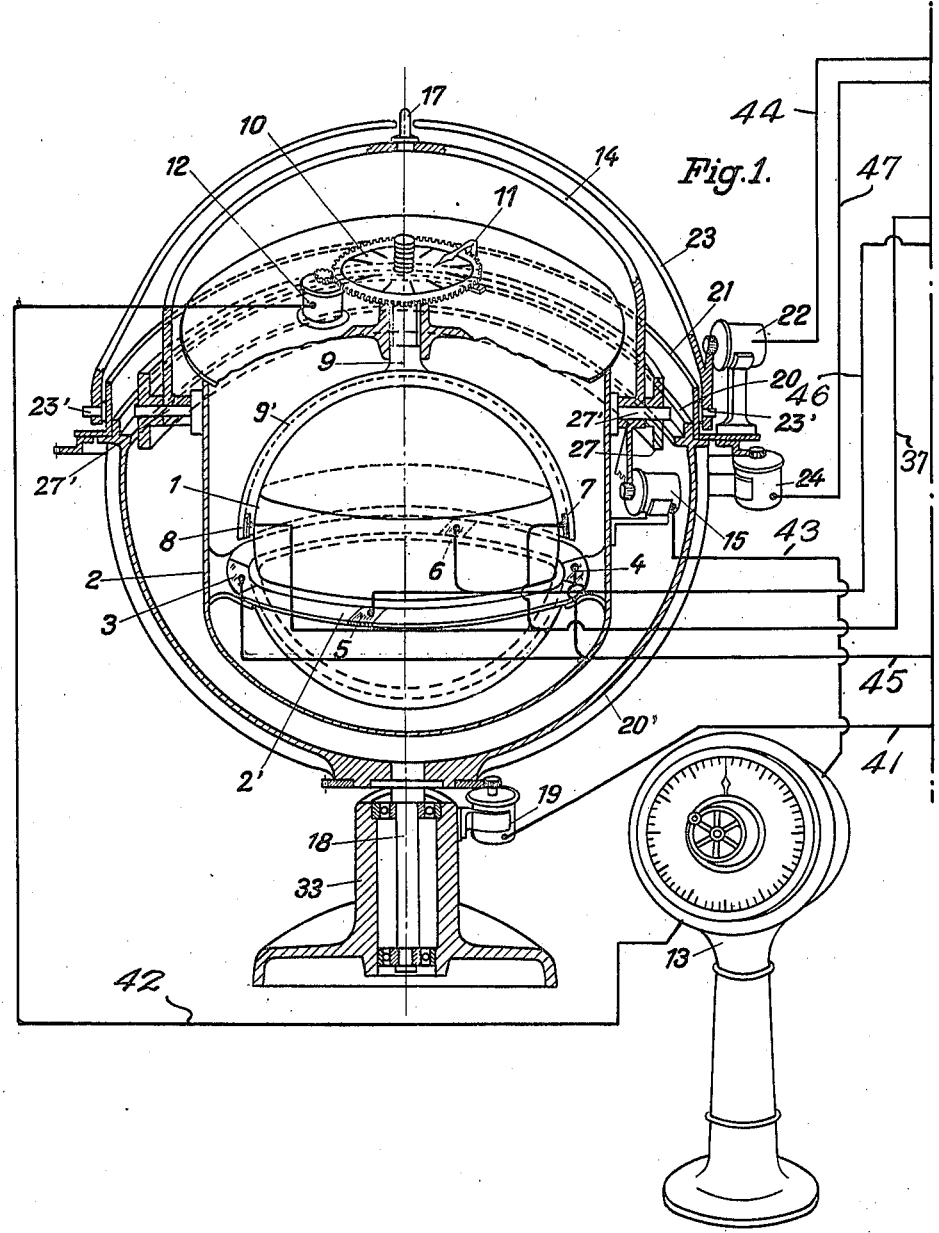

1,840,104

UNITED STATES PATENT OFFICE

HERMANN ANSCHÜTZ-KAEMPFE, OF MUNICH, GERMANY, ASSIGNOR TO NEDERLANDSCHE TECHNISCHE HANDEL MAATSCHAPPIJ "GIRO", OF THE HAGUE, NETHERLANDS

GYROSCOPIC APPARATUS FOR STABILIZING BODIES

Application filed April 6, 1929, Serial No. 353,012, and in Germany April 16, 1928.

My invention relates to a gyroscopic apparatus installed on a craft for the purpose of stabilizing movable motor-controlled bodies.

In applicant's application Ser. No. 303,582, filed on September 1, 1928 is described a gyroscopic apparatus in which the angular movements of its support about the three principal axes relative to its gyroscope system are transmitted to repeater or reading devices which are thereby stabilized about all the three principal axes. When the possibilities of application of such repeater devices on board ships at sea are considered, it will be found that there are many applications in which stabilization about two axes is sufficient for practical purposes. Among such applications may be mentioned for instance those to nearly all optical instruments such as measuring, observation and distance control telescopes such as they are described in the German Patent No. 300,751. In the case of such instruments, turns of the same about their optical axis need not be eliminated and, for this reason, they are supported on the ship to be rotatable about two axes only namely about an axis vertical to the ship, hereinafter referred to as A (as an abbreviation for azimuth), and about a second axis which is horizontal and at right angles to the first, the axis E (as abbreviation for elevation).

As long as the instruments to be stabilized are of small size and weight, as is the case for instance with theodolites, they may be mounted on a platform held in horizontal position in the manner heretofore described and may also be prevented from making horizontal or azimuth turns. In the case of heavier and larger objects, for instance of searchlights of the kind shown in the aforementioned Patent No. 300,751, and in the case of guns, this would necessitate a complicated supporting structure as is evident from the fact that there are required two receiver motors or other devices for the setting from a distance of the A and E axes relatively to the horizontal platform, in addition to the three receiver motors serving to stabilize the platform.

The invention primarily contemplates the control of such and similarly supported bodies which may remain at liberty to turn about their optical axis, but otherwise are to be kept in an invariable position unaffected by turns or rocking of the ship, and has for its object to couple the functions of the various motors with a view to stabilizing said bodies, under the remote control of a gyroscopic compass, by means of three motors only. These motors turn the body about its A and E axes relatively to the rocking ship in such a manner that a third axis, e. g. the optical axis, may be set in any desired direction and will, then, automatically remain in that direction parallel to itself. The invention has, furthermore, for its object, by reducing to a minimum the number of intermediate members used for the transmission, to keep as small as possible the deviations between the prescribed and the real position of the bodies, which deviations can never be completely avoided, and to provide devices for indicating the degree of deviation. The latter is of particular importance when the body to be stabilized is of great inertia such as large caliber guns and their towers.

In one aspect, the present invention is based on reversing the rectangular co-ordinates of rotation of the gyroscopic system with the use of the relations between the different angles, known from simple kinetic considerations. One feature of novelty consists in the fact that, instead of the "oblique angle system" being driven from the right angle system, the oblique angle system drives the right angle system in order to keep its position coinciding with that of the gyroscopic system. Owing to this very essential inversion, the above mentioned great advantages are obtained.

Figures 1 and 1A represent a preferred embodiment of the invention. Figure 1 shows diagrammatically the master gyroscope apparatus which is provided with the necessary devices for the stabilization and distance control, for instance of a searchlight, and having a control installation of the well-known kind, and Figure 1A a searchlight provided with means for stabilization.

Figures 2 and 3 are diagrams illustrating the operation.

The spherically shaped gyroscopic system 1 which serves to maintain the follow-up system in horizontal position, and which preferably forms part of a gyro-compass, is mounted in a shell or casing 2 which is rotatable about three axes and is turned by means of servomotors to follow the gyroscopic system 1 in the course of its turns about the vertical axis or either one of the principal horizontal axes. For this purpose the casing 2 is mounted to be rotatable about both horizontal principal axes and carried in its interior rigidly connected to its walls the follow-up ring 2', surrounding the spherical gyroscope system 1 and carrying pairs of conductive faces 3, 4 and 5, 6 which control the follow-up turns of ring 2' about the horizontal axes in the manner heretofore explained. The casing 2 is pivotally mounted in a Cardan ring 27 by means of diametrically opposite pivots 27', while the Cardan ring 27 is swingably supported in a surrounding ring 20 by means of two similar diametrically opposite pivots displaced by 90° with regard to the pivots 27' and, for this reason, not visible in Fig. 1. Consequently, the suporting ring 27 is capable of swinging about an axis which is parallel to an imaginary line connecting the conductive faces 5 and 6, while the casing 2 supported by ring 27 may swing about this axis and the axis of the pivots 27'.

The ring 20 is carried by a support 20' provided with a downwardly extending pivot 18 rotatably journaled in a foot 33 by means of anti-friction bearings. On this foot a follow-up motor 19 is mounted which is in driving connection with a suitable gear attached to the support 20', whereby the latter may be turned about the axis of the pivot 18 which is normally vertical to the ship. The casing 2 is provided with a cover forming a bearing for a vertical axle 9 which carries a bail 9'. The latter is at its downwardly extending ends provided with two conductive faces 7 and 8 which control the follow-up motor 19, through the cable 37 connected to remote servo-motor 19', seen in Fig. 1A, which, through gears 38, 39 and 40, directly drives transmitter motor 19", which in turn, through cable 41, is connected to and drives aforementioned servo-motor 19. Hence, the follow-up motor 19 is operative to turn the bail 9', bodily with the support 20', the Cardan ring 27 and the casing 2, at any time into a predetermined direction, e. g. into the meridian.

The position of the casing 2 relative to the bail 9', or in other words, to the meridian may be varied, as desired, by means of a motor 12 mounted upon the cover of the casing 2 and adapted to drive a gear 10 attached to the axle 9. The position, to which the casing 2 is adjusted relative to the meridian, and in which it is kept by action of the follow-up motor 19, is indicated by a hand 11 on a suitable scale provided on gear 10.

In the drawings, it has been assumed that the motor 12 represents a receiver motor of a control installation 13, which, by remote control through cable connection 42, permits any desired number of rotations to be imparted to motor 12. As such control installations are well-known in the art, a description thereof is not given herein.

From the fore-going it is apparent that the casing 2 may be set from the control installation 13 to any desired position relative to the meridian and will, subsequently, be automatically maintained in such position by action of the follow-up motor 19.

The casing 2 carries a bracket 14, shown partly in section in Figure 1, which is swingably mounted on the pivots 27' and may be adjusted relatively to the casing by a second receiver motor 15 which is connected by cable 43 to and is also under remote control from the control installation 13 and is mounted on the casing 2 in driving connection with a toothed segment attached to the bracket 14. The latter carries at its center an upwardly projecting pin 17 which may thus be pointed from the control installation 13 into any desired direction relative to the horizon and to the meridian.

If it be assumed that the casing 2 reproduces exactly the position of the gyroscope ball, and that the latter remains exactly in the meridian and in the horizontal plane, it will be obvious that the angle between the connection line of the pair of conductive surfaces 7 and 8 for the azimuth turning and the zero position of scale 10, will represent the azimuth of the pin 17 and that the angle set by the receiver motor 15, will be the angle of elevation of the pin 17. With these assumptions, the line drawn through the pin 17 and the point of intersection of the Cardan axes, will form therefore a line parallel to the axis which is set by the servo-motors 12 and 15 with regard to the horizon in elevation and with regard to the N-S direction of the compass in azimuth.

The follow-up motor 19 co-operates with the conductive faces 7 and 8 in the manner described above, and is caused to revolve in synchronism with a motor 19' by action of a transmitter 19" of the searchlight (Fig. 1A), and keeps the support 20 of the compass always in the azimuth set by the motor 12.

In the following, the action of the follow-up motors will be described which are controlled by the conductive faces 3, 4, 5 and 6. On the support 20 is rotatably guided a ring 21 which is parallel to the deck of the ship. The ring 21 is provided with a toothed rim which meshes with a pinion driven by a receiver motor 24. On diametrically opposite pivots 23' of the ring 21 is mounted a bail or bracket 23 provided with a hole through which the above-mentioned pin 17 projects. The angle of elevation of this bracket 23 is set by a receiver motor 22 mounted on ring 21 and being in driving connection with a toothed segment attached to the bracket 23. This receiver motor 22 is connected by cable 44 to remote transmitter 22'' (Fig. 1A), and is driven thereby in accordance with the operation of the searchlight which is described later.

In order to cause the casing 2 to closely follow all movements of the gyroscope system 1 relatively to the rocking ship, the ring 21 and the bracket 23 are, as will easily be understood, to be turned in exactly the same sense and the same degree, as the A—axle and the E—axle of the searchlight must be turned to ensure the desired immobility of the searchlight beam.

In accordance with these considerations, the horizontal position of ring 2' in the casing 2 is maintained by action of the motors 22 and 24 which are operative to move at any time the pin 17 into that location in which the ring 2' is horizontal, in the manner described hereinafter. It is to be noted that ring 2' is firmly, although adjustably, connected with the pin 17 through the intermediary of casing 2, motor 15 which has been set to the desired position, and bracket 14, so that the position of ring 2' may be varied by moving pin 17.

On the searchlight are mounted, in the manner which will appear from Figure 1A, three motors of which 19' and 24' act together through a differential gear 25' on the A axis, whilst the motor 22' sets the E axis. As already stated, the motor 19' is controlled by the conductive faces 7 and 8, in synchronism with the motor 19 through the cable connection 37; the motor 24' is controlled by the pair of conductive faces 3 and 4 in synchronism with motor 24 through the cable connection 45, and the motor 22' is controlled by the conductive faces 5 and 6 in synchronism with motor 22 through the cable connection 46, either through relays or other devices for amplifying the current impulses passing the pairs of conductive faces. The motors 19', 24' and 22' are each provided, as already mentioned in connection with 19, with a transmitter 19'' or 24'' or 22'' (Figure 1A), connected by respective cables 41, 47 and 44, which serves to ensure said synchronism. As the electrical connections of a motor with a coordinated transmitter and receiver motor are well-known in the art and do not form part of present invention, an illustration and description thereof is not given herein, and reference may be had to Patents Nos 502,399, 996 331, and 1,094,487, if greater details of such systems are desired, while Patent No. 1,589,039 illustrates a construction of the motor units which, in a practical arrangement, may be used in connection with the amplifier system shown in Patent No. 1,586,233.

The operation of the arrangement as regards the motors and receivers 19, 19' and 22, 22' will easily be understood, as the motors 19 and 19' provide in both apparatus for the maintenance of the azimuth, set from the control station by motor 12, and the motor 22 for the maintenance of the elevation set by motor 15.

The action of the motor 24', however, will not be obvious at first glance, as this motor and the synchronously running receiver motor 24 work on an axis at right angles to the plane of ring 2', whilst the pair of conductive faces 3, 4 on which they depend in operation, is turned by them about an axis horizontal relatively to the ship. The explanation is that the turns of the ring 21 about the axis vertical to the ring 2', produced by the receiver motor 24, is split up into two component turns, namely one about the pin 17 which is of no consequence, and one about that Cardan axis of the Cardan ring 27 which is parallel to the line connecting the faces 5 and 6. When owing to the rocking of the ship, the conductive faces 3 and 4 have been inclined relatively to the non-turnable gyroscope ball 1, current will be thereby caused to flow, which will drive the motor 24' and will thus produce a turn of the searchlight about the A axis. At the same time, there will take place a synchronous turning of the ring 21, and, therefore, the return of the conductive faces 3 and 4 to their normal position relatively to the gyroscope ball 1.

The arrangement causing the current to flow in consequence of an inclination of the ring 2' carrying the faces 3 and 4, has been described in connection with the first described embodiment and, for this reason, need not be described herein.

On the searchlight therefore, Figure 1A, the motor 19' reproduces the "side", and the motor 24' the lateral correction for heeling. On the searchlight, the motor 24' need not be more powerful than the other two, whilst in the master gyroscope there will take place a gearing up at small elevations with regard to the angular paths of the ring 21 and of the conductive faces 3 and 4.

The motor 22' reproduces chiefly the elevation which has been set by motor 15. Moreover, it provides for the necessary compensation of changes in the elevation which would be caused by the heeling of the ship.

In that way it is possible to get the movements of the searchlight or any other bodies about the A and E axes controlled directly by the master gyroscopic instrument. Of course, the motors must be sufficiently powerful to avoid a substantial lagging in all practically occurring angular movements of the ship. The inertia momenta of the masses to be moved, more particularly of the motor armatures, however, always prevent the follow-up devices from strictly assuming the prescribed position but cause them to slightly oscillate about the same.

This is diagrammatically indicated on an exaggerated scale in Figure 2, the line 29 representing a given movement of the ship, for instance a regular rolling movement, whilst the line 30 is intended to indicate that the corresponding pair of motor-driven follow-up conductive faces alternatively lags and leads again. If the forces are suitably dimensioned, it is possible to ensure that these oscillations will remain small and take place quickly. It is, however, never possible completely to suppress them, because the movements of the ship do not take place as regularly as assumed in Fig. 2. Consequently, it is important for many purposes to determine or to utilize the moments in which the surrounding sinuous line 30 intersects the basic curve 29, i. e. in which the pairs of conductive faces exactly register with the equator of the gyroscopic ball 1.

These moments can be determined when the motors 19', 24' and 22' do not get any current, for current is sent into the motors only when the conductive faces deviate from their normal position. For utilizing the said circumstance coils of measuring instruments or relays 31 and 32 are inserted in the wires or leads to the motors 19' and 22', compare Figure 1A. These relays are adapted to open at 33 and 34 a control circuit when the motors get current, or close it when there is no current or only a very weak current. Indicators such as voltmeters 48, 49 and 50, are inserted in said control circuit to give indication of the periods during which no current or a weak current is flowing through the relay coils, or, in other words, of the periods, during which the searchlight or similar device is correctly adjusted. Obviously, the voltmeters 48, 49 and 50 do not give any indication when no current is flowing in the corresponding circuits. In dependence on the time sensitiveness or current sensitiveness of these relays, the degree of accuracy can be substantially improved in this way, as indicated in Fig. 3 by the two chain dotted curves 35 and 36. If only one motor had to be considered, a large series of correct time moments would be available according to Figure 2 at each rolling movement, and the follow-up device could be utilized with practically the same success as one "following" quite strictly.

This method, however, could also be applied when two different follow-up devices are co-operating, by connecting in series the two points of interruption of the relays 31 and 32 as indicated in Figure 1A, as a few points of intersection must always approximately coincide.

It will be, as a rule, possible to do without such a relay in the circuit of the motor 24' as the azimuth correction assumes small values only.

For setting guns, the invention could also be used in such a form that the motors 19' 24' and 22' will control not directly the gun, but any desired control device. Even then the invention has the advantage that all corrections, such as compensations for windage, humidity, barometric changes, and the like, are taken in account from the beginning in the adjustment of the pin 17 on the master compass in the vertical and lateral direction, that is to say exactly, they are not utilized by a process of approximation in the setting of the gun.

The invention covers further a case in which the reference body, for instance in the example described, the gyroscope ball, stabilized about three axes, is replaced by other devices. The horizon of such device could be maintained horizontal by a suitable manipulation on ground of observations by telescopes, and the azimuth could be adjusted, by a gyroscopic or other compass. One of the main ideas of the invention, namely that the movement of the parts to be kept coincident with the horizon, is effected not directly but in a round about way through bodies rotatable about deviating axes, can also be utilized here. The observers at the horizon telescopes will then operate each a switch for the right and left hand rotation, which controls the motors 22 and 24, through the described transmitters and receivers and through brackets 23 and 14, sets or adjusts the telescopes until they are again in the direction of the horizon when they had been brought out of it by the movements of the ship.

What I claim is:

1. In apparatus of the character described, the combination of a gyroscopic system capable of maintaining its position relative to horizon and meridian, a follow-up member co-ordinated to said gyroscopic system and movably mounted on a craft to be capable of turning about its three principal axes, a body mounted on said craft to be swingable about two axes only, viz: an axis perpendicular to the craft and about an axis horizontal to the craft, driving means associated with said body to turn it about said two axes, means for operating said driving means in response to departures of said follow-up member from a normal predetermined position relative to said gyroscopic system, motors in driving relation to said follow-up member and adapted to turn it about its three principal axes, said motors and said driving means being connected to one another to impart corresponding turns to said follow-up member and to said body, thereby tending, whenever said departure occurs owing to movements of said craft, to restore said follow-up member to the afore-mentioned normal position and to simultaneously keep one axis of said body in a predetermined spatial relation to said gyroscopic system.

2. In apparatus of the character described installed on a craft, the combination of a gyroscopic system capable of maintaining its position relative to horizon and meridian, a follow-up member co-ordinated to said gyroscopic system and movably mounted on said craft to be capable of turning about its three principal axes, a body mounted on said craft to be swingable about two axes only, driving means associated to said body to turn it about said two axes, means for operating said driving means in response to departures of said follow-up member from a normal predetermined position relative to said gyroscopic system, three servo-motors in driving relation to said follow-up member and adapted to turn it about its three principal axes, two of said servo-motors being operative to cause a turn about an axis parallel to one of the afore-mentioned two axes and the third servo-motor about an axis parallel to the other one of said two axes, said servo-motors and said driving means being connected to one another to impart equal turns to said follow-up member and to said body, thereby tending, whenever said departure occurs owing to movements of said craft, to restore said follow-up member to the afore-mentioned normal position and to simultaneously keep one axis of said body in a predetermined spatial relation to said follow-up member.

3. The combination set forth in claim 2, in which said two axes are perpendicular to each other one being perpendicular to the deck of the craft.

4. In apparatus of the character described installed on a craft, the combination of a gyroscopic system capable of maintaining its position relative to horizon and meridian, a follow-up system co-ordinated to said gyroscopic system and movably mounted on said craft to be swingable about its three principal axes, a follow-up member adjustably but firmly secured to said follow-up system, remote-control means to modify the position of said member relative to said follow-up system, a body mounted on said craft to be swingable about two axes only, driving means associated to said body to turn it about said two axes, means for operating said driving means in response to departures of said follow-up member from a normal predetermined position relative to said gyroscopic system, three servo-motors in driving relation to said follow-up member and adapted to turn it about its three principal axes, two of said servo-motors being operative to cause a turn about an axis parallel to one of the afore-mentioned two axes and the third servo-motor about an axis parallel to the other one of said two axes, said servo-motors and said driving means being connected to one another to impart equal turns to said follow-up member and to said body, thereby tending, whenever said departure occurs owing to movements of said craft, to restore said follow-up member to the afore-mentioned normal position and to simultaneously keep one axis of said body in a predetermined spatial relation to said follow-up member.

5. In apparatus of the character described installed on a craft, the combination of a gyroscopic system capable of maintaining its position relative to horizon and meridian, a follow-up system co-ordinated thereto, a gimbal suspension constituted by rings carrying said follow-up system, servo-motors operating upon said follow-up system to keep it in a predetermined position relative to said gyroscopic system, a body mounted on said craft to be swingable about certain axes relatively to the craft, driving motors associated with said body to turn it about said axes, means for synchronizing said servo-motors with said driving motors, at least one of said axes being independent in direction from any of the axes of said rings, a bail swingable about pivots parallel to said independent axis being provided as an intermediary between one of said servo-motors and said follow-up system.

6. The combination set forth in claim 1 in which said means for operating said driving means in response to departures of said follow-up member from a normal predetermined position relative to said gyroscopic system comprise electric circuits in which currents proportional to said departures are caused to flow and which are equipped with indicators giving indication of the times at which a number of said circuits are free from current.

7. In apparatus of the character described, the combination of a controlling member capable of being maintained in its position relative to horizon and meridian, a follow-up member co-ordinated with said controlling member and movably mounted on a craft to be capable of turning about its three principal axes, a body mounted on said craft to be swingable about two axes only, viz: an axis perpendicular to the craft and about an axis horizontal to the craft, driving means associated to said body to turn it about said two axes, means for operating said driving means in response to departures of said follow-up member from a normal predetermined position relative to said controlling member, motors in driving relation to said follow-up member and adapted to turn it about its three principal axes, said motors and said driving means being connected to one another to impart corresponding turns to said follow-up member and to said body, thereby tending, whenever said departure occurs owing to movements of said craft, to restore said follow-up member to the afore-mentioned normal position and to simultaneously keep one axis of said body in a predetermined spatial relation to said controlling member.

8. In apparatus of the character described, the combination of a controlling member capable of being maintained in its position relative to horizon and meridian, a follow-up system co-ordinated therewith, a gimbal suspension constituted by rings carrying said follow-up system, servo-motors operating upon said follow-up system to keep it in a predetermined position relative to said controlling member, a body mounted on said craft to be swingable about certain axes relatively to the craft, driving motors associated to said body to turn it about said axes, means for synchronizing said servo-motors with said driving motors, at least one of said axes being independent in direction from any of the axes of said rings, a bail swingable about pivots parallel to said independent axis being provided as an intermediary between one of said servo-motors and said follow-up system.

In testimony whereof I have affixed my signature.

Dr. HERMANN ANSCHÜTZ-KAEMPFE.